United States Patent
Lan et al.

(10) Patent No.: US 12,449,970 B2
(45) Date of Patent: Oct. 21, 2025

(54) SCREEN CONTROL METHOD, SCREEN CONTROL APPARATUS, ELECTRONIC DEVICE, PROGRAM, AND MEDIUM

(71) Applicant: BOE Technology Group Co., Ltd., Beijing (CN)

(72) Inventors: Wenjin Lan, Beijing (CN); Qingbing Liu, Beijing (CN); Guoqiang Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/702,982

(22) PCT Filed: Jul. 31, 2023

(86) PCT No.: PCT/CN2023/110352
§ 371 (c)(1),
(2) Date: Apr. 19, 2024

(87) PCT Pub. No.: WO2024/045985
PCT Pub. Date: Mar. 7, 2024

(65) Prior Publication Data
US 2024/0411446 A1    Dec. 12, 2024

(30) Foreign Application Priority Data
Aug. 31, 2022    (CN) .......................... 202211054745.7

(51) Int. Cl.
*G06F 3/04883* (2022.01)
*G06F 3/04817* (2022.01)
*G06F 3/14* (2006.01)

(52) U.S. Cl.
CPC ...... *G06F 3/04883* (2013.01); *G06F 3/04817* (2013.01); *G06F 3/1454* (2013.01)

(58) Field of Classification Search
None
See application file for complete search history.

(56) References Cited

U.S. PATENT DOCUMENTS

| | | | |
|---|---|---|---|
| 2018/0070389 A1 | 3/2018 | Morgan | |
| 2020/0249822 A1* | 8/2020 | Penilla | H04L 63/105 |
| 2021/0334060 A1 | 10/2021 | Lee et al. | |

(Continued)

FOREIGN PATENT DOCUMENTS

| | | |
|---|---|---|
| CN | 111221491 A | 6/2020 |
| CN | 113360116 A | 9/2021 |
| CN | 113485626 A | 10/2021 |

(Continued)

*Primary Examiner* — Nicholas J Lee
(74) *Attorney, Agent, or Firm* — WHDA, LLP

(57) ABSTRACT

The present disclosure provides a screen control method, a screen control apparatus, an electronic device, a program and a medium, relates to the technical field of display. The method includes: receiving an image picture displayed by a non-touch terminal without a touch function, and displaying the image picture in a touch screen; receiving a touch operation on the image picture; in response to the touch operation, sending a control instruction corresponding to the touch operation to the non-touch terminal, wherein the control instruction is used for instructing the non-touch terminal to execute a control operation on the image picture.

17 Claims, 10 Drawing Sheets

```
┌────────────────────────────────────────────────────────────┐  101
│  Receiving an image picture displayed by a non-touch       │
│  terminal without a touch function, and displaying the     │
│  image picture in a touch screen                           │
└────────────────────────────────────────────────────────────┘
                              │
                              ▼
┌────────────────────────────────────────────────────────────┐  102
│         Receiving a touch operation on the image picture   │
└────────────────────────────────────────────────────────────┘
                              │
                              ▼
┌────────────────────────────────────────────────────────────┐  103
│  Sending a control instruction corresponding to the touch  │
│  operation to the non-touch terminal in response to the    │
│  touch operation, wherein the control instruction is used  │
│  for instructing the non-touch terminal to execute a       │
│  control operation on the image picture                    │
└────────────────────────────────────────────────────────────┘
```

(56) References Cited

U.S. PATENT DOCUMENTS

2022/0324327 A1 10/2022 Huang et al.
2024/0012503 A1 1/2024 Li et al.

FOREIGN PATENT DOCUMENTS

| CN | 114327185 A | 4/2022 |
| CN | 115390713 A | 11/2022 |
| WO | 2022/111239 A1 | 6/2022 |

\* cited by examiner

Click event information is transmitted to a non-touch screen device after an interaction area No. 2 is clicked

SCREEN CONTROL METHOD, SCREEN CONTROL APPARATUS, ELECTRONIC DEVICE, PROGRAM, AND MEDIUM

CROSS-REFERENCE TO RELATED APPLICATION

The application claims priority to the Chinese patent application filed on Aug. 31, 2022 before the Chinese Patent Office with the application number of 202211054745.7, and the title of "SCREEN CONTROL METHOD, SCREEN CONTROL APPARATUS, ELECTRONIC DEVICE, PROGRAM, AND MEDIUM", which is incorporated herein in its entirety by reference.

TECHNICAL FIELD

The present disclosure relates to the technical field of display, and particularly to a screen control method, a screen control apparatus, an electronic device, a program, and a medium.

BACKGROUND

In the related art, a non-touch screen is used as a display device and a remote controller is mainly used by a user to operate the screen. Specifically, when the user selects content of interest on the non-touch screen, the user needs to press up, down, left, and right buttons on the remote controller repeatedly, move a selection buoy on the non-touch screen to a position of interest, and then click a determination button to view the selected content.

In the previous era in which push-button mobile phones are popular, there is still a high degree of acceptance of such interactive mode via buttons. With the increasing development of science and technology, large-screen mobile phones with no or few buttons become more and more popular, and people are more accustomed to selection by clicking, enlarging, and dragging a touch-control screen, but touch operation cannot be achieved on a device with the non-touch screen.

SUMMARY

The present disclosure provides a screen control method, a screen control apparatus, an electronic device, a program, and a medium.

Some embodiments of the present disclosure provide a screen control method, applied to a touch terminal with a touch function, and the method includes:
  receiving an image picture displayed by a non-touch terminal without the touch function, and displaying the image picture in a touch screen;
  receiving a touch operation on the image picture; and
  sending a control instruction corresponding to the touch operation to the non-touch terminal in response to the touch operation, wherein the control instruction is used for instructing the non-touch terminal to execute a control operation on the image picture.

Optionally, displaying the image picture in a touch screen comprises:
  acquiring a mapping relationship between a touchable identifier and a picture position carried in the image picture; and
  adding a touchable identifier corresponding to the picture position in a touchable display area corresponding to the picture position in the image picture;
  wherein sending a control instruction corresponding to the touch operation to the non-touch terminal comprises:
  determining a touchable identifier corresponding to a picture position instructed by the touch operation; and
  sending a control instruction carrying the touchable identifier to the non-touch terminal, wherein the control instruction is used for instructing the non-touch terminal to execute a control operation corresponding to the touchable identifier on the image picture.

Optionally, after adding a touchable identifier corresponding to the picture position, the method further comprises:
  displaying a non-touch display area which is not added with the touchable identifier and the touchable display area in the image picture differently.

Optionally, displaying a non-touch display area which is not added with the touchable identifier and the touchable display area in the image picture differently comprises:
  displaying the non-touch display area in the image picture in a weakened manner and/or displaying the touchable display area in the image picture in a highlighted manner.

Optionally, after adding a touchable identifier corresponding to the picture position, the method further comprises:
  displaying the touchable identifier in a display area outside the image picture in the touch screen.

Optionally, before receiving an image picture displayed by a non-touch terminal without the touch function, and displaying the image picture in a touch screen, the method further comprises:
  determining a connectable non-touch terminal in a communication network after accessing the communication network;
  sending a connection request to the non-touch terminal; and
  establishing communication connection with the non-touch terminal in response to a connection permission notification sent by the non-touch terminal based on the connection request.

Optionally, when the communication network is a local area network, determining a connectable non-touch terminal in the communication network comprises:
  receiving a connection signal carrying a first network address broadcast by the non-touch terminal in the communication network;
  wherein sending a connection request to the non-touch terminal comprises:
  sending a connection request carrying a local second network address to the non-touch terminal based on the first network address.

Optionally, when the communication network is a cloud network, determining a connectable non-touch terminal in the communication network comprises:
  sending an access request carrying local identity information to a cloud server; and
  receiving a connectable non-touch terminal identifier corresponding to the local identity information sent by the cloud server;
  wherein sending a connection request to the non-touch terminal comprises:
  sending the connection request to a target non-touch terminal corresponding to a target non-touch terminal identifier in response to a selection operation on the target non-touch terminal identifier.

Some embodiments of the present disclosure provide a screen control method, applied to a non-touch terminal without a touch function, and the method comprises:

sending an image picture to a touch terminal with the touch function when the image picture is displayed by a non-touch screen;

receiving a control instruction sent by the touch terminal for the image picture; and executing a control operation corresponding to the control instruction on the image picture.

Optionally, sending an image picture to a touch terminal with the touch function comprises:

performing screen capture on the non-touch screen to obtain the image picture;

establishing a mapping relationship between a touchable picture position and a touchable identifier in the image picture; and sending the image picture carrying the mapping relationship to the touch terminal;

wherein executing a control operation corresponding to the control instruction on the image picture comprises:

acquiring a touchable identifier carried in the control instruction;

querying a click event corresponding to the touchable identifier; and executing the control operation corresponding to the click event on the image picture.

Some embodiments of the present disclosure provide a screen control apparatus, applied to a touch terminal with a touch function, wherein the apparatus comprises:

a first receiving module configured to receive an image picture displayed by a non-touch terminal without the touch function, and display the image picture in a touch screen;

a touch module configured to receive a touch operation on the image picture; and a first sending module configured to send a control instruction corresponding to the touch operation to the non-touch terminal in response to the touch operation, wherein the control instruction is used for instructing the non-touch terminal to execute a control operation on the image picture.

Optionally, the first receiving module is further configured to:

acquire a mapping relationship between a touchable identifier and a picture position carried in the image picture; and add a touchable identifier corresponding to the picture position in a touchable display area corresponding to the picture position in the image picture.

The first sending module is further configured to:

determine a touchable identifier corresponding to a picture position instructed by the touch operation; and send a control instruction carrying the touchable identifier to the non-touch terminal, wherein the control instruction is used for instructing the non-touch terminal to execute control operation corresponding to the touchable identifier on the image picture.

Optionally, the first receiving module is further configured to:

display a non-touch display area which is not added with the touchable identifier and the touchable display area in the image picture differently.

Optionally, the first receiving module is further configured to:

display the non-touch display area in the image picture in a weakened manner and/or displaying the touchable display area in the image picture in a highlighted manner.

Optionally, the first receiving module 601 is further configured to:

display the touchable identifier in a display area outside the image picture in the touch screen.

Optionally, the apparatus further includes:

a communication module configured to:

after accessing a communication network, determine a connectable non-touch terminal in the communication network;

send a connection request to the non-touch terminal; and establish communication connection with the non-touch terminal in response to a connection permission notification sent by the non-touch terminal based on the connection request.

Optionally, when the communication network is a local area network, the communication module is further configured to:

receive a connection signal carrying a first network address broadcast by a non-touch terminal in the communication network; and send a connection request carrying a local second network address to the non-touch terminal based on the first network address.

Optionally, when the communication network is a cloud network, the communication module is further configured to:

send an access request carrying local identity information to a cloud server;

receive a connectable non-touch terminal identifier corresponding to the identity information sent by the cloud server; and send a connection request to a target non-touch terminal corresponding to a target non-touch terminal identifier in response to selection operation on the target non-touch terminal identifier.

Some embodiments of the present disclosure provide a screen control apparatus, applied to a non-touch terminal without a touch function, wherein the apparatus comprises:

a second sending module configured to send an image picture to a touch terminal with the touch function when the image picture is displayed by a non-touch screen;

a second receiving module configured to receive a control instruction sent by the touch terminal for the image picture; and a control module configured to execute a control operation corresponding to the control instruction on the image picture.

Optionally, the second sending module is further configured to:

perform screen capture on the non-touch screen to obtain an image picture;

establish a mapping relationship between a touchable picture position and a touchable identifier in the image picture; and send the image picture carrying the mapping relationship to the touch terminal.

The control module is further configured to:

acquire a touchable identifier carried in the control instruction;

query a click event corresponding to the touchable identifier; and execute control operation corresponding to the click event on the image picture.

Some embodiments of the present disclosure provide a display device, comprising a screen and a processor, wherein the processor is configured to execute steps of the screen control method described above, and the screen is configured to display the image picture.

Some embodiments of the present disclosure provide a computing and processing device, comprising:
- a memory having a computer-readable code stored therein; and
- one or more processors, wherein when the computer-readable code is executed by the one or more processors, the computing and processing device executes the screen control method described above.

Some embodiments of the present disclosure provide a computer program, comprising a computer-readable code which, when running on a computing and processing device, causes the computing and processing device to execute the screen control method described above.

Some embodiments of the present disclosure provide a non-transitory computer-readable medium, having a computer program of the screen control method described above stored therein.

The above description is only an overview of the technical solution of the present disclosure. In order to have a clearer understanding of the technical means of the present disclosure, it can be implemented according to the content of the specification. In order to make the above and other purposes, features, and advantages of the present disclosure more obvious and easier to understand, the specific implementation methods of the present disclosure are listed below.

BRIEF DESCRIPTION OF THE DRAWINGS

In order to provide a clearer explanation of the technical solutions in the embodiments of the present disclosure or prior art, a brief introduction will be given below to the accompanying drawings required in the embodiments or prior art description. It is evident that the accompanying drawings in the following description are some of the embodiments of the present disclosure, and for those skilled in the art, other accompanying drawings can be obtained based on these drawings without creative effort.

DETAILED DESCRIPTION

In order to clarify the purpose, technical solution, and advantages of the embodiments of the present disclosure, the following will provide a clear and complete description of the technical solution in the embodiments of the present disclosure in conjunction with the accompanying drawings. Obviously, the described embodiments are a part of the embodiments of the present disclosure, not all of them. Based on the embodiments of the present disclosure, all other embodiments obtained by persons skilled in the art without creative labor fall within the scope of protection of the present disclosure.

Figure 1:
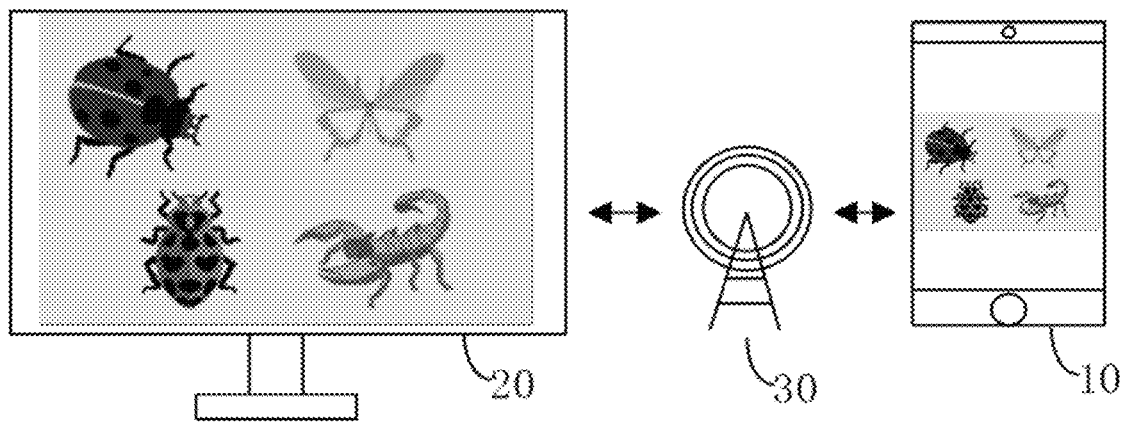
FIG. 1 schematically shows an architecture diagram of a screen control system according to some embodiments of the present disclosure.

FIG. 1 schematically shows an architecture diagram of a screen control system provided by the present disclosure, and the screen control system includes a touch terminal 10, a non-touch terminal 20, and a network device 30.

It should be noted that the non-touch terminal 20 is a terminal device without a touch function, such as a television, a projector, and a conference site screen. Generally, a display picture on the non-touch terminal may only be adjusted by controlling an output device where a signal source is located via a remote controller, or the picture is adjusted by directly operating the output device. The touch terminal 10 is a terminal device with a touch function, such as a mobile phone, a tablet computer, and a touch computer, and generally the display picture on the touch terminal may be directly operated based on touch operation of a user. The network device 30 is a device for providing a communication network between the touch terminal 10 and the non-touch terminal 20, such as a gateway device, and a server. Certainly, if a distance between the touch terminal 10 and the non-touch terminal 20 is relatively short, communication connection may also be performed via a built-in short-distance communication module such as Bluetooth; and if the distance between the touch terminal 10 and the non-touch terminal 20 is relatively long, the communication connection between the touch terminal 10 and the non-touch terminal 20 is generally achieved by adopting an external network provided by the network device 30.

After both the touch terminal 10 and the non-touch terminal 20 access the communication network provided by the network device 30, communication connection may be established through the following process:

A1. the non-touch terminal 20 broadcasts a connection signal carrying local network information to the communication network;

A2. the touch terminal 10 displays a non-touch terminal identifier corresponding to the non-touch terminal 20 in response to the received connection signal;

A3. the touch terminal 10 sends a connection request to the non-touch terminal 20 in response to a selection operation on a target non-touch terminal identifier of a user; and A4. the non-touch terminal 20 displays query information about whether to share a screen, and establishes communication connection with the touch terminal 10 in response to permission operation input by the user.

Figure 2:
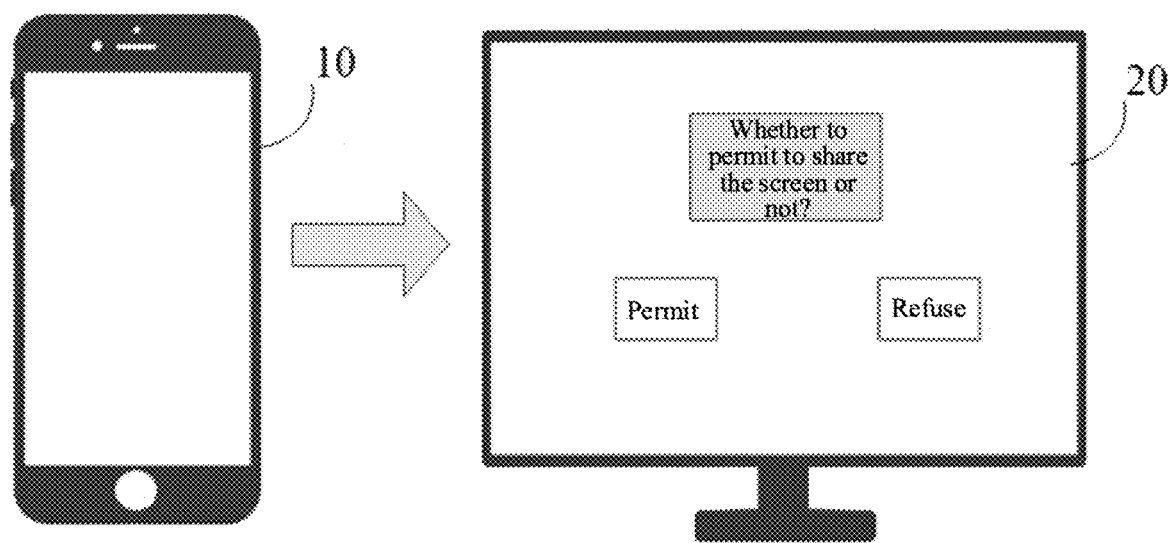
FIG. 2 schematically shows a first effect diagram of a screen control method according to some embodiments of the present disclosure.

Illustratively, with reference to FIG. 2, information may be displayed by the non-touch terminal 20.

The above steps A2-A4 are applicable to the case where the touch terminal 10 is a master control device, and when the non-touch terminal 20 is the master control device, the steps A2-A4 may be replaced with the following steps B1-B2:

B1. the touch terminal 10 displays query information about whether to share a screen in response to a received connection signal; and B2. the touch terminal 10 establishes communication connection with the non-touch terminal 20 in response to the permission operation input by the user.

Figure 3:
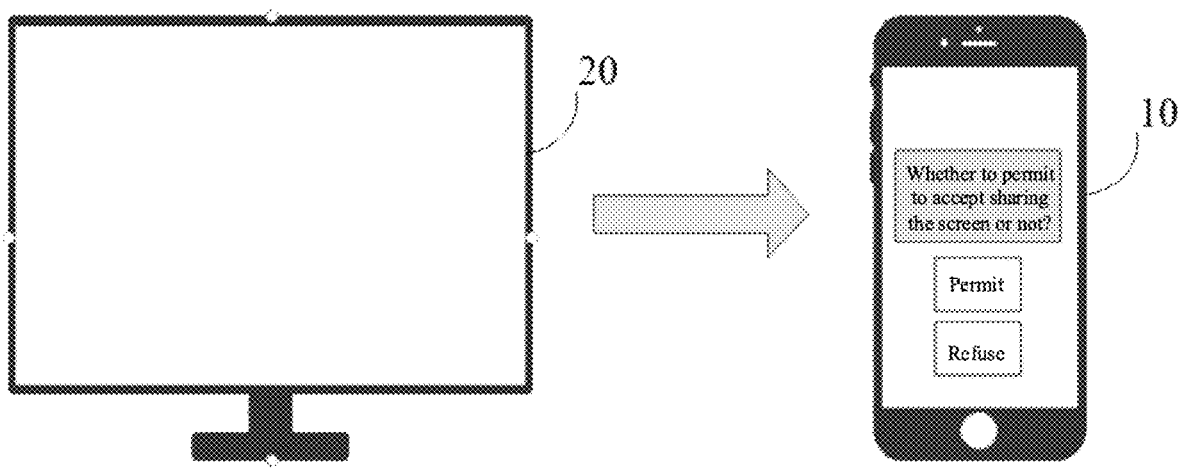
FIG. 3 schematically shows a second effect diagram of a screen control method according to some embodiments of the present disclosure.

Illustratively, with reference to FIG. 3, information may be displayed by the touch terminal 10.

An interaction process between the touch terminal 10 and the non-touch terminal 20 is as follows:

C1. when displaying an image picture, the non-touch terminal 20 sends the image picture carrying a touchable identifier to the touch terminal 10;

C2. the touch terminal 10 displays the image picture added with the touchable identifier;

C3. the touch terminal 10 sends a control instruction carrying a target touchable identifier to the non-touch terminal 20 in response to a touch operation on the target touchable identifier of the user; and C4. the non-touch terminal 20 queries a click event corresponding to the target touchable identifier, and executes control operation corresponding to the click event on the image picture in response to the control instruction.

According to an example of the present disclosure, by sending an image picture on a non-touch terminal to a touch terminal and marking a touchable identifier, after a user performs touch operation on the touch terminal, the touch terminal sends the touch identifier selected by the user to the non-touch terminal, so that the non-touch terminal may execute the control operation on the image picture displayed on a non-touch screen according to the touch operation on picture content on the touch terminal of the user, thereby improving the convenient control of the image picture on the non-touch terminal.

Figure 4:
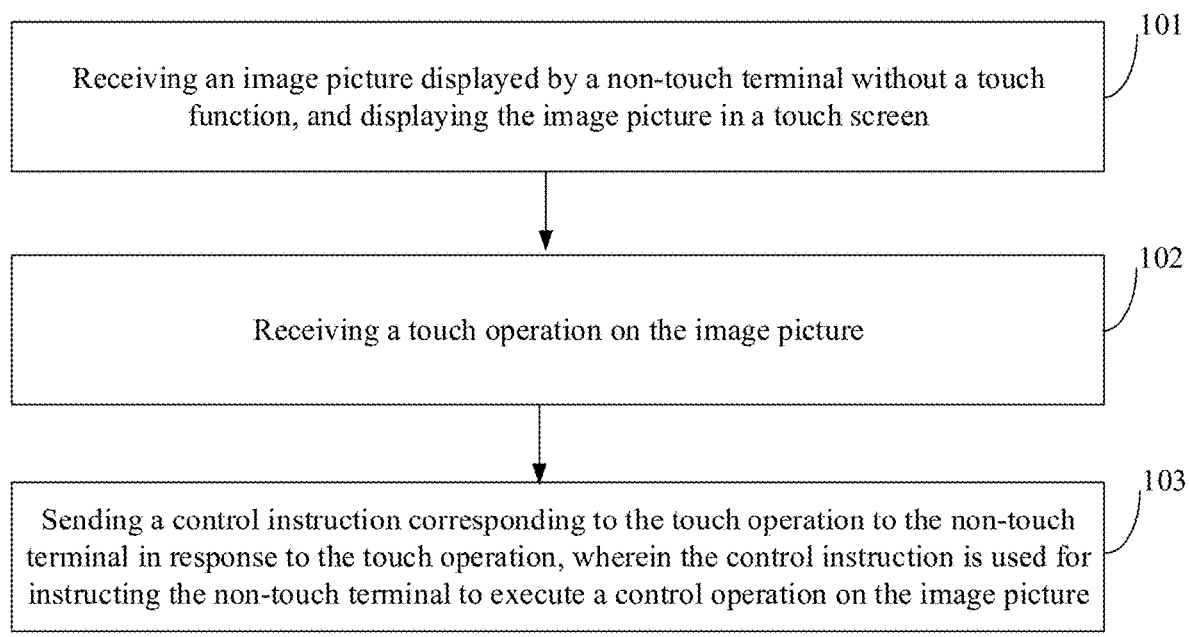
FIG. 4 schematically shows a flow chart of a screen control method according to some embodiments of the present disclosure.

FIG. 4 schematically shows a flow chart of a screen control method provided by the present disclosure, applied to a touch terminal with a touch function. The method includes the following steps.

Step 101. Receiving an image picture displayed by a non-touch terminal without the touch function, and displaying the image picture in a touch screen.

In an embodiment of the present disclosure, after the touch terminal acquires an image sharing right of the non-touch terminal, the non-touch terminal may send the image picture to the touch terminal in real time when displaying the image picture, while the touch terminal will synchronously display the image picture on the local touch screen for subsequent touch operation of the user.

Step 102. Receiving a touch operation on the image picture.

In the embodiment of the present disclosure, as a data source of the image picture is at the non-touch terminal, the touch terminal cannot directly perform rendering and generation processes of the image picture, and may only collect touch operation modes and positions on the image picture of a user, for example, touch operation such as clicking, long-pressing, and sliding at one or more image positions in the image picture of the user.

Step 103. Sending a control instruction corresponding to the touch operation to the non-touch terminal in response to the touch operation, wherein the control instruction is used for instructing the non-touch terminal to execute control operation on the image picture.

In the embodiment of the present disclosure, the picture positions and touch modes of the touch operation are different, and corresponding control modes are also different; therefore, the touch terminal may generate a control instruction describing the touch operation mode, and may also directly query an instruction identifier corresponding to the touch mode or the touch position in a local command table to generate a control instruction directly carrying the instruction identifier. After generating the control instruction, the touch terminal may send the control instruction to the non-touch terminal, and the non-touch terminal will execute the image picture according to a control operation mode instructed by the control instruction.

According to the embodiment of the present disclosure, the non-touch terminal sends the displayed image picture to the touch terminal for the user to perform the touch operation, and the touch terminal sends the control instruction to the non-touch terminal according to the touch operation, so that the non-touch terminal controls the displayed image picture according to the control instruction, thereby achieving the touch operation on the image picture in the non-touch terminal.

Figure 5:
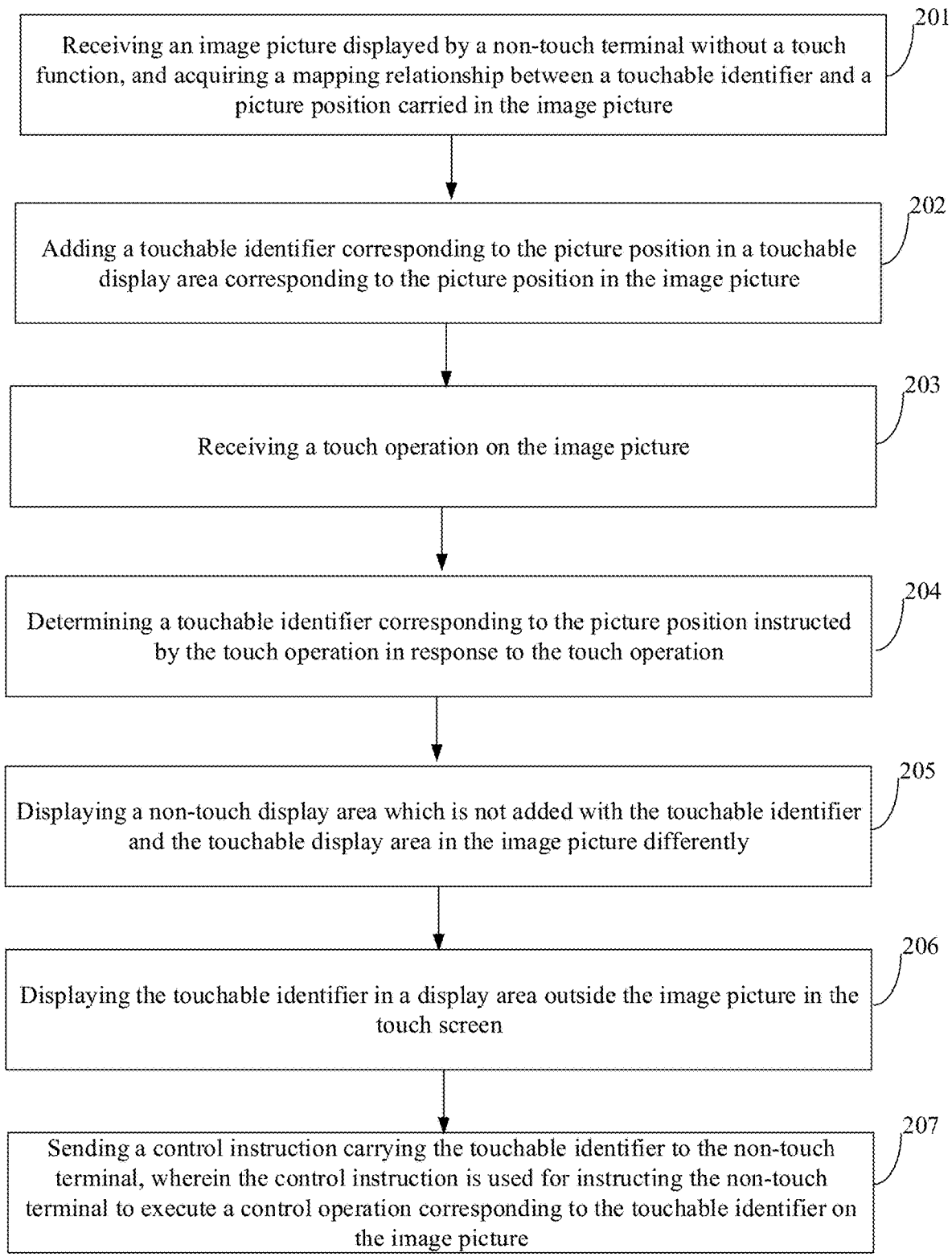
FIG. 5 schematically shows a flow chart of another screen control method according to some embodiments of the present disclosure.

FIG. 5 schematically shows a flow chart of another screen control method provided by the present disclosure, applied to a touch terminal with a touch function. The method includes the following steps.

Step 201. Receiving an image picture displayed by a non-touch terminal without a touch function, and acquiring a mapping relationship between a touchable identifier and a picture position carried in the image picture.

In an embodiment of the present disclosure, before sending the image picture, the touch terminal will acquire interactively operable picture positions present in the current image picture, and convert and encode each image position based on the actual size of a non-touch screen, for example, the format is (X %, Y %), wherein X % is an abscissa and Y % is an ordinate, and then all the image positions are stored in a List data structure, wherein a uniquely corresponding touchable identifier, such as a number and a symbol mark, is also set for each picture position. When interaction is performed between the touch terminal and the non-touch terminal, the non-touch terminal will send a mapping relationship List to the touch terminal. It is worth mentioning that the mapping relationship may be sent to the touch terminal in advance by the non-touch terminal, so that the touch terminal may directly call for use in the interaction process, or the mapping relationship may be sent to the touch terminal simultaneously when the non-touch terminal sends different image pictures, so that the mapping relationship may be adapted to different image pictures, which may be specifically set according to actual requirements, and is not limited herein.

Step 202. Adding a touchable identifier corresponding to the picture position in a touchable display area corresponding to the picture position in the image picture.

In the embodiment of the present disclosure, considering that the user may not know that, on which image areas, the touch operation may be performed to control the image picture in the non-touch terminal by directly viewing the image picture, when displaying the image picture, the touch terminal in the present disclosure adds a touchable identifier corresponding to the picture position according to a touchable display area corresponding to the picture position in the mapping relationship, so that the user may identify the display area on which the touch operation may be performed according to the touchable identifier.

Step 203. Receiving the touch operation on the image picture.

Reference may be made to the detailed description of step 102 for this step, and it will not be repeated herein.

Step 204. Determining a touchable identifier corresponding to the picture position instructed by the touch operation in response to the touch operation.

In the embodiment of the present disclosure, after receiving the touch operation on the touch screen of the user, the touch terminal queries the touchable identifier corresponding to the touch operation according to the picture position corresponding to the touch operation, and it may be understood that the touch operation is not necessarily identical to the touch position in the mapping relationship, and therefore a picture position closest to the touch position may be selected as the picture position instructed by the touch operation.

Step 205. Displaying a non-touch display area which is not added with the touchable identifier and the touchable display area in the image picture differently.

In the embodiment of the present disclosure, considering that the user may not be able to define the touchable display area corresponding to the touchable identifier, and the touch operation may be performed on the non-touch display area wrongly, thereby resulting in the case where the touch operation of the user has no response in the screen of the non-touch terminal, the non-touch display area and the touchable display area in the image picture are displayed differently according to the present disclosure, so that the user may intuitively distinguish the touchable display area in the image picture.

Step 206. Displaying the touchable identifier in a display area outside the image picture in the touch screen.

In the embodiment of the present disclosure, the display area outside the image picture may be an area above, below or at a side of the image picture, and by displaying the touchable identifier in the display area outside the image picture, the user may intuitively view the overall situation of the touchable identifier.

Figure 6:
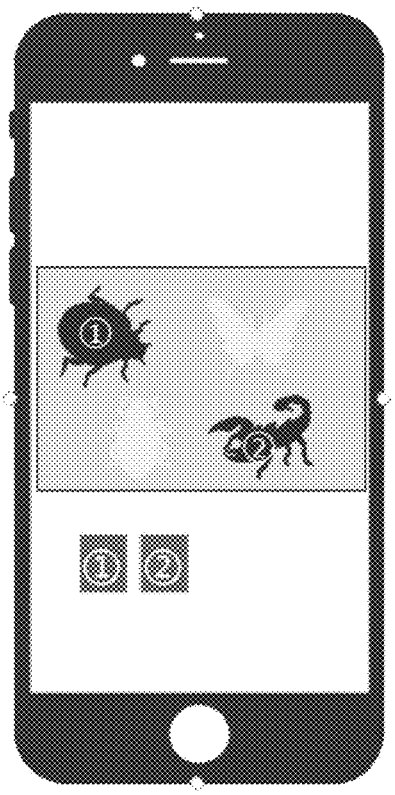
FIG. 6 schematically shows a third effect diagram of a screen control method according to some embodiments of the present disclosure.

Illustratively, with reference to FIG. 6, numbered touchable identifiers are arranged and displayed below the image picture, so that the user may visually see all the touchable identifiers.

Figure 7:
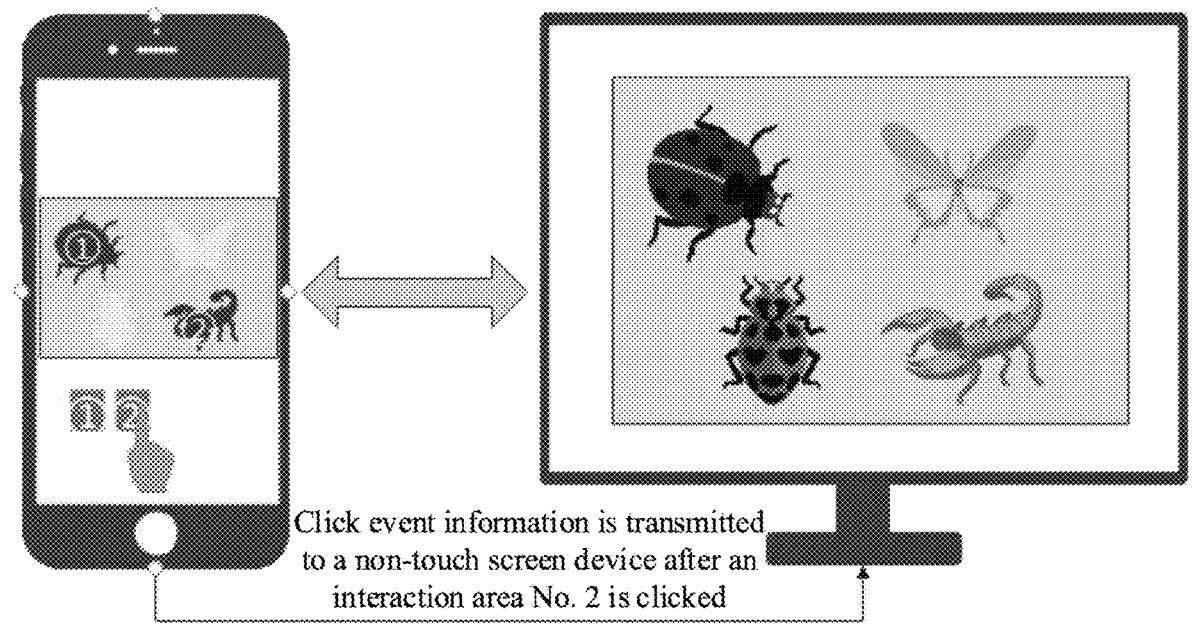
FIG. 7 schematically shows a fourth effect diagram of a screen control method according to some embodiments of the present disclosure.
Figure 8:
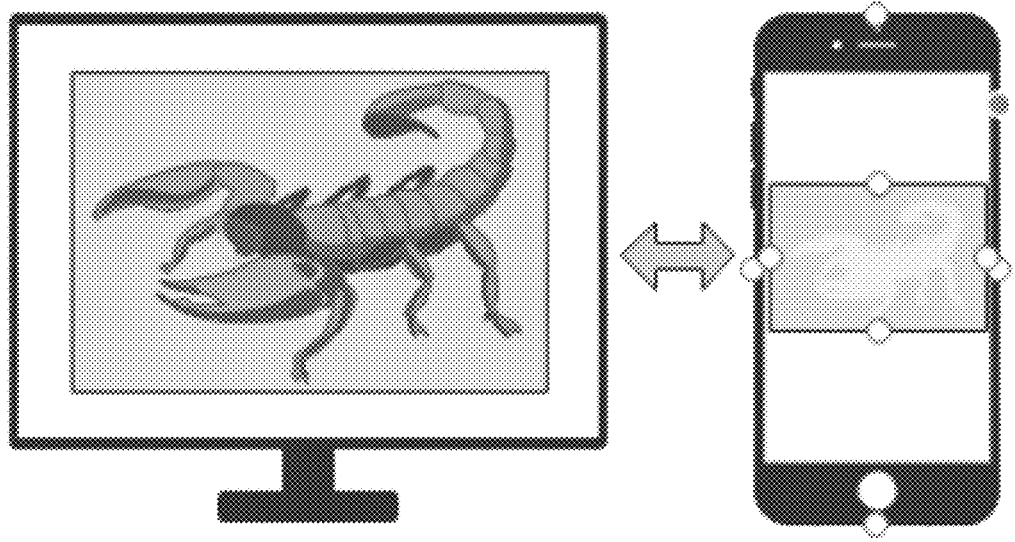
FIG. 8 schematically shows a fifth effect diagram of a screen control method according to some embodiments of the present disclosure.

Thus, the user may enable the touch terminal to send the control instruction to the non-touch terminal by operating the touchable identifier arranged and displayed. With reference to FIG. 7, after the user clicks the touchable mark "2", a control instruction describing a click event of the touchable mark "2" may be sent to the non-touch terminal; and thus, with reference to FIG. 8, the non-touch terminal may adjust the image area of the scorpion marked by "2" to be white, which is of course only an exemplary description herein, may be specifically set according to actual requirements, and is not limited herein.

Step 207. Sending a control instruction carrying the touchable identifier to the non-touch terminal, wherein the control instruction is used for instructing the non-touch terminal to execute a control operation corresponding to the touchable identifier on the image picture.

In the embodiment of the present disclosure, the touch terminal sends the control instruction carrying the touchable identifier instructed by the user to the non-touch terminal. After receiving the control instruction, the non-touch terminal will locally query the control operation corresponding to the touchable identifier, and execute the control operation on the image picture.

According to the embodiment of the present disclosure, by utilizing the touchable identifier for marking an operable image area in the image picture, and sending the control instruction to the non-touch terminal according to the touchable identifier selected by the user, not only the user may intuitively view the touchable display area, but also the non-touch terminal may execute different control operation on the image picture according to different touchable identifiers, thereby improving the flexibility of performing image control on the non-touch terminal by the touch terminal.

Optionally, the step 205 includes: displaying the non-touch display area in the image picture in a weakened manner and/or displaying the touchable display area in the image picture in a highlighted manner.

In the embodiment of the present disclosure, in order to further improve the visible display effect of the touchable display area, according to the present disclosure, the non-touchable display area is displayed in a weakened manner by reducing image parameters such as brightness, contrast, and chroma of the non-touchable display area compared with an original display effect of the image picture, so that the non-touchable display area is more invisible compared with the original display effect of the image picture. However, correspondingly, the touchable display area is displayed in a highlighted manner by increasing image parameters such as brightness, contrast, and chroma, so that the touchable display area is more obvious compared with the original display effect of the image picture. Thus, the user may more intuitively distinguish the touchable display area and the non-touch display area in the image picture.

Figure 9:
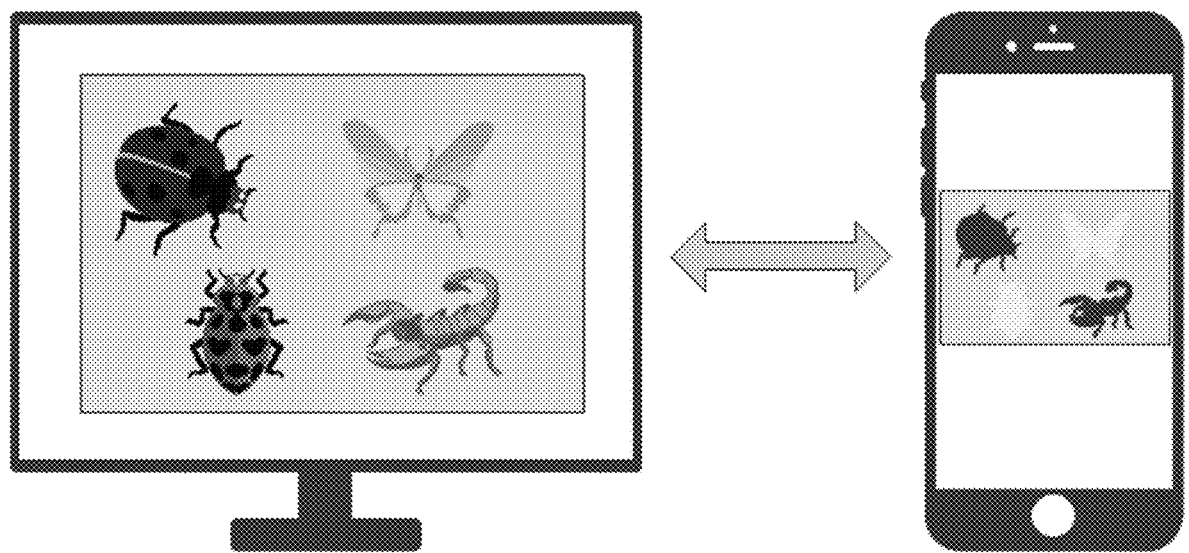
FIG. 9 schematically shows a sixth effect diagram of a screen control method according to some embodiments of the present disclosure.

Illustratively, with reference to FIG. 9, insects in an upper left corner and a lower right corner are touchable display areas, and display color of the insects is deepened and highlighted, while insects in a lower left corner and an upper right corner are non-touchable display areas, and are displayed in white for weakening, so as to form a sharp contrast between the touchable display areas and the non-touchable display areas in the display effect, so that the user may more intuitively distinguish, which is of course only an exemplary description herein, may be specifically set according to actual requirements, and is not limited herein.

Figure 10:
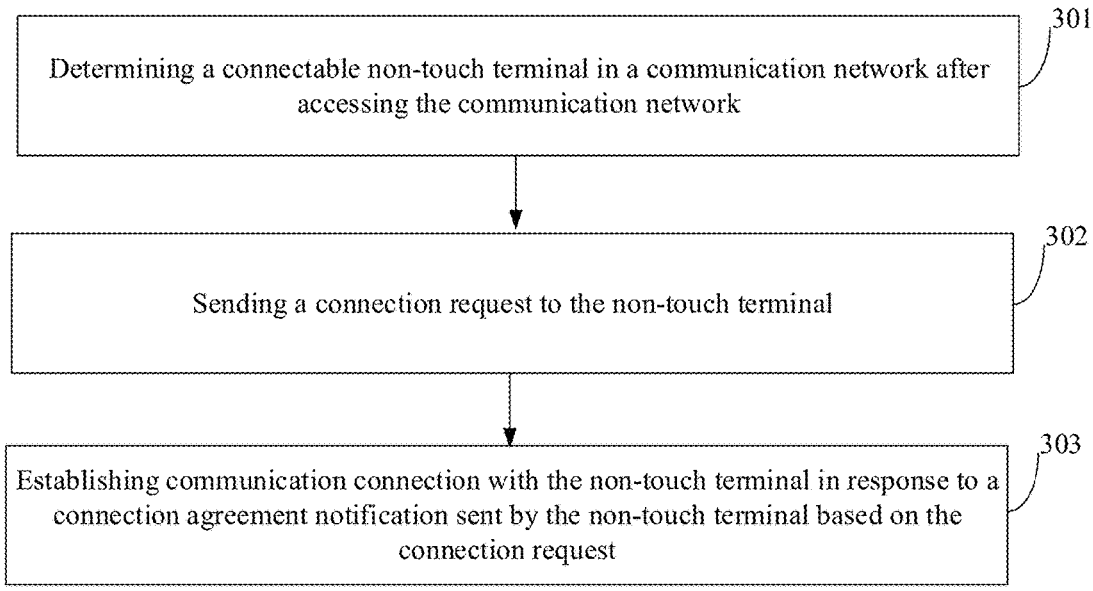
FIG. 10 schematically shows a flow chart of a communication connection method according to some embodiments of the present disclosure.

Optionally, with reference to FIG. 10, before step 201, the method further includes the following steps.

Step 301. Determining a connectable non-touch terminal in the communication network after accessing a communication network.

Step 302. Sending a connection request to the non-touch terminal.

Step 303. Establishing communication connection with the non-touch terminal in response to a connection permission notification sent by the non-touch terminal based on the connection request.

With reference to the above description, the touch terminal may establish communication connection with the non-touch terminal by sending the connection request to the non-touch terminal.

Optionally, when the communication network is a local area network, the step 301 includes: receiving a connection signal carrying a first network address broadcast by the non-touch terminal in the communication network; and the step 302 includes: sending a connection request carrying a local second network address to the non-touch terminal based on the first network address.

Figure 11:
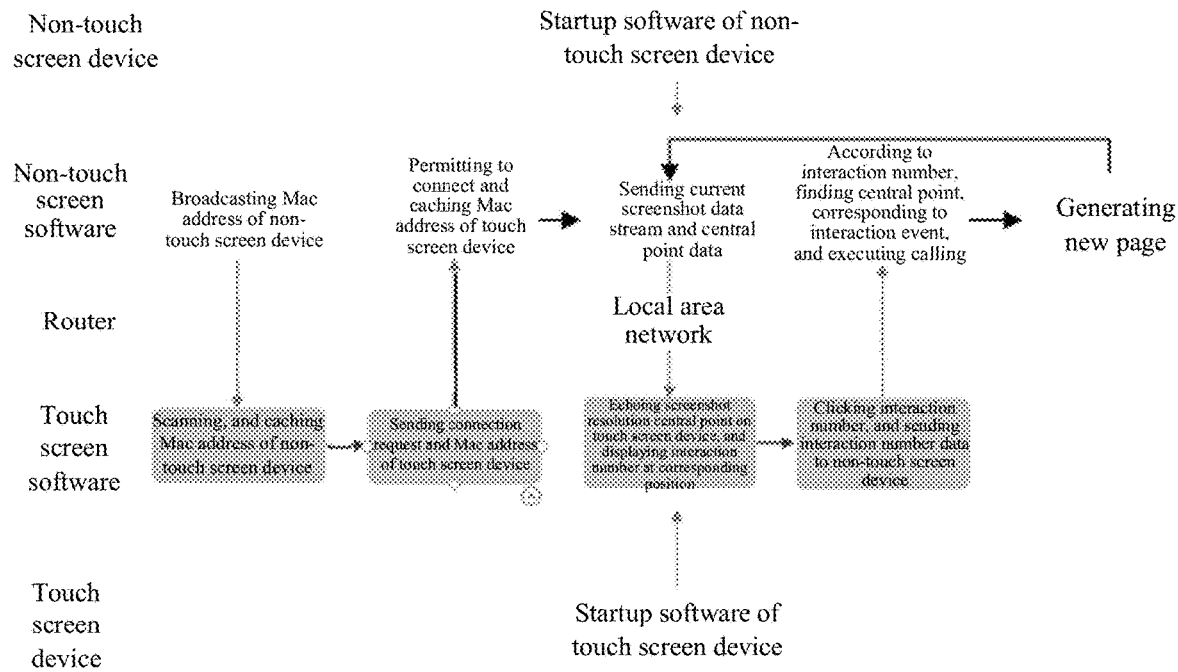
FIG. 11 schematically shows a logic diagram of a screen control method according to some embodiments of the present disclosure.

In the embodiment of the present disclosure, with reference to FIG. 11, when the communication network is a local area network, software for executing steps of a screen control mode provided by the embodiment of the present disclosure is installed in the touch terminal and the non-touch terminal, so that after the touch terminal and the non-touch terminal are started, the software will automatically run to connect to the same local area network. The non-touch terminal broadcasts a connection signal and a local first network address (a MAC address of the non-touch terminal) within the local area network according to a network communication protocol of the local area network. The touch terminal searches for the connection signal in the local area network, records the first network address carried by the connection signal after searching for the connection signal, and sends a connection request containing a second network address of the touch terminal (a MAC address of the touch terminal) to a non-touch terminal. After receiving the connection request, the non-touch terminal will prompt the user whether to permit the connection, and if the user permits, the first network address of the touch terminal is recorded, and communication connection is established with the touch terminal, and if the user does not permit, the connection is not established.

Optionally, when the communication network is a cloud network, step 301 includes: sending an access request carrying local identity information to a cloud server; and receiving a connectable non-touch terminal identifier corresponding to the identity information sent by the cloud server; and the step 302 includes: sending a connection request to a target non-touch terminal corresponding to a target non-touch terminal identifier in response to selection operation on the target non-touch terminal identifier.

Figure 12:
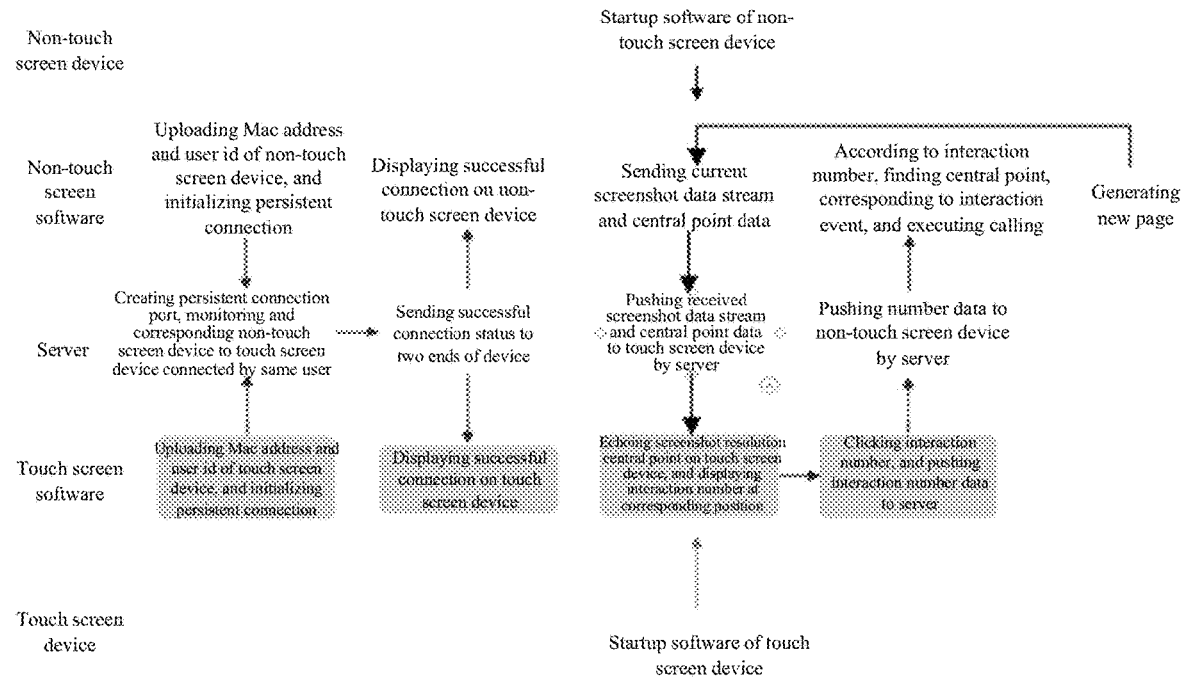
FIG. 12 schematically shows a logic diagram of another screen control method according to some embodiments of the present disclosure.

In the embodiment of the present disclosure, with reference to FIG. 12, after logging into the cloud server, both the non-touch terminal and the touch terminal will report user identity information and a local physical MAC address to the cloud server, and initialize a socket port to maintain persistent connection with the cloud server. The cloud server creates a socket persistent connection port to monitor the touch terminal and the non-touch terminal connected to the cloud server, and performs one-to-one correspondence between the touch terminal and the non-touch terminal corresponding to the same user identity information according to user identity information of the connected device, so that when the touch terminal requests query, a non-touch terminal identifier corresponding to the user identity information is sent to the touch terminal for viewing, and the touch terminal sends a connection request to the cloud server according to the target non-touch terminal identifier selected by the user, thereby achieving communication connection between the target non-touch terminal of the cloud server and the touch terminal.

Figure 13:
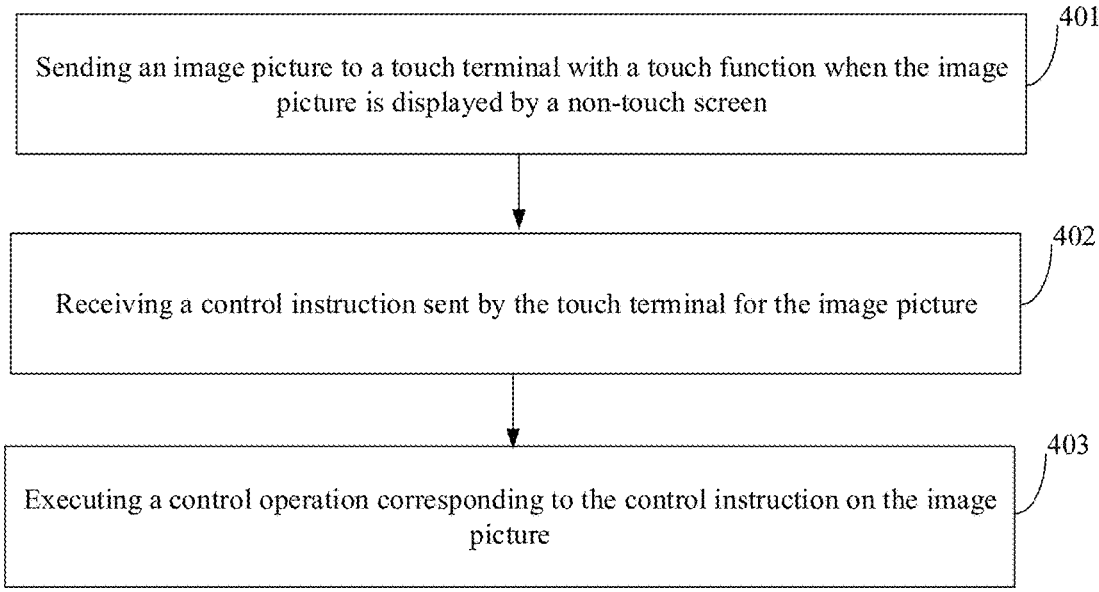
FIG. 13 schematically shows a flow chart of yet another screen control method according to some embodiments of the present disclosure.

FIG. 13 schematically shows a flow chart of yet another screen control method provided by the present disclosure, applied to a non-touch terminal without a touch function. The method includes the following steps.

Step 401. Sending an image picture to a touch terminal with a touch function when the image picture is displayed by a non-touch screen.

Step 402. Receiving a control instruction sent by the touch terminal for the image picture.

Step 403. Executing control operation corresponding to the control instruction on the image picture.

In the embodiment of the present disclosure, the non-touch terminal may perform screen capture on the displayed content to obtain an image picture, then convert the highlighted picture into a form of a data stream, and send the data stream to the touch terminal. The manner in which the touch terminal sends the control instruction according to the image picture and the manner in which the non-touch terminal performs control operation on the image picture based on the control instruction may refer to the description of the above embodiments, and will not be described in detail herein.

According to the embodiment of the present disclosure, the non-touch terminal sends the displayed image picture to the touch terminal for the user to perform touch operation, and the touch terminal sends the control instruction to the non-touch terminal according to the touch operation, so that the non-touch terminal controls the displayed image picture according to the control instruction, thereby achieving the touch operation on the image picture in the non-touch terminal.

Figure 14:
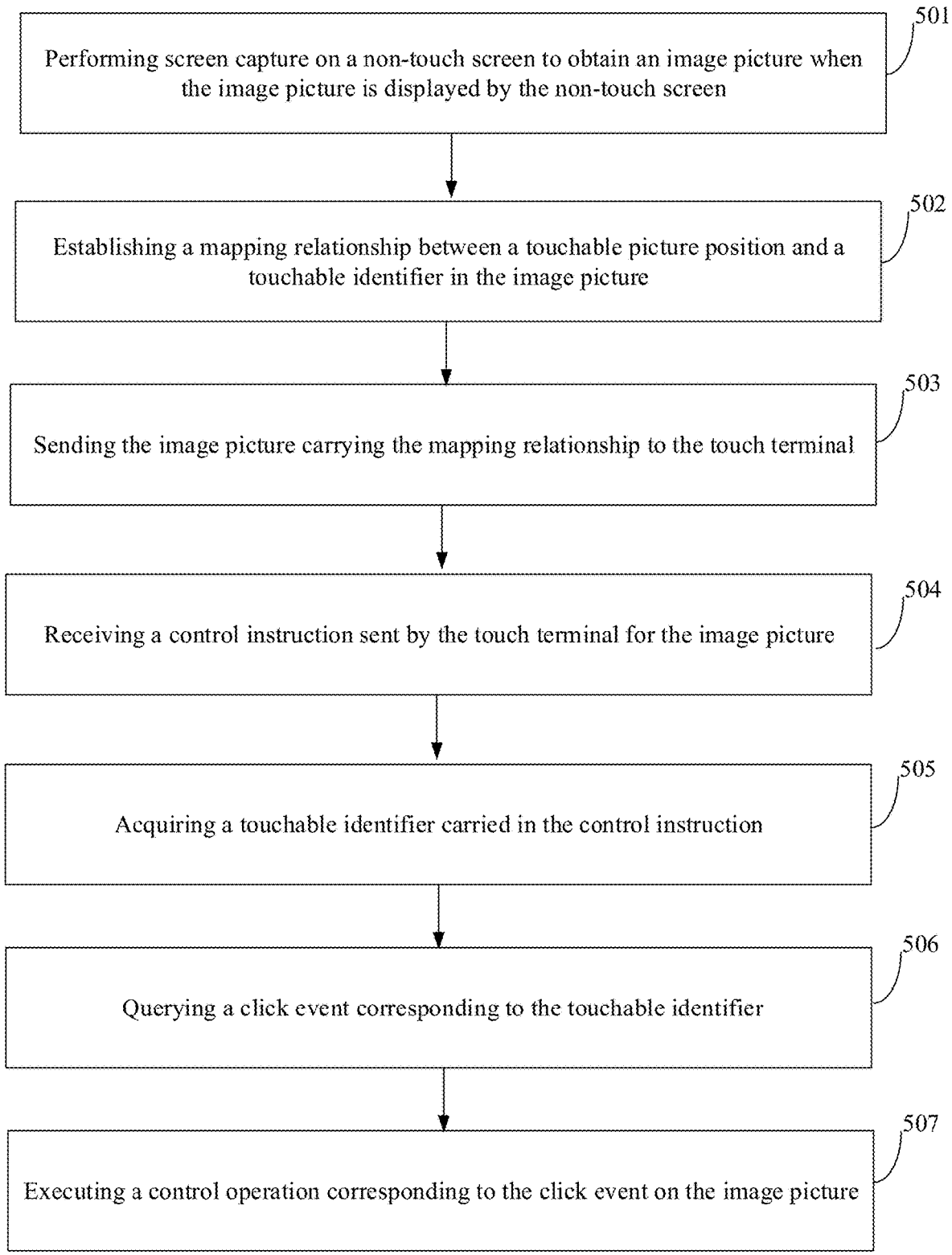
FIG. 14 schematically shows a flow chart of yet another screen control method according to some embodiments of the present disclosure.

FIG. 14 schematically shows a flow chart of yet another screen control method provided by the present disclosure, applied to a non-touch terminal without a touch function. The method includes the following steps.

Step 501. Performing screen capture on a non-touch screen to obtain an image picture when the image picture is displayed by the non-touch screen.

Step 502. Establishing a mapping relationship between a touchable picture position and a touchable identifier in the image picture.

Step 503. Sending the image picture carrying the mapping relationship to the touch terminal.

In the embodiment of the present disclosure, software on the non-touch terminal acquires a page screenshot of the current screen, acquires interaction position center information present in a current page, converts each interaction position center into a position code based on the actual size of the screen of the non-touch terminal, obtains a mapping relationship after numbering, and provides the mapping relationship and the image picture to the touch terminal.

Step 504. Receiving a control instruction sent by the touch terminal for the image picture.

Step 505. Acquiring a touchable identifier carried in the control instruction.

Step 506. Querying a click event corresponding to the touchable identifier.

Step 507. Executing a control operation corresponding to the click event on the image picture.

According to the embodiment of the present disclosure, the non-touch terminal sends the displayed image picture to the touch terminal for the user to perform touch operation, and the touch terminal sends the control instruction to the non-touch terminal according to the touch operation, so that the non-touch terminal controls the displayed image picture according to the control instruction, thereby achieving the touch operation on the image picture in the non-touch terminal.

According to the embodiment of the present disclosure, by utilizing the touchable identifier for marking an operable image area in the image picture, and sending the control instruction to the non-touch terminal according to the touchable identifier selected by the user, not only the user may intuitively view the touchable display area, but also the non-touch terminal may execute different control operations on the image picture according to different touchable identifiers, thereby improving the flexibility of performing image control on the non-touch terminal by the touch terminal.

Figure 15:
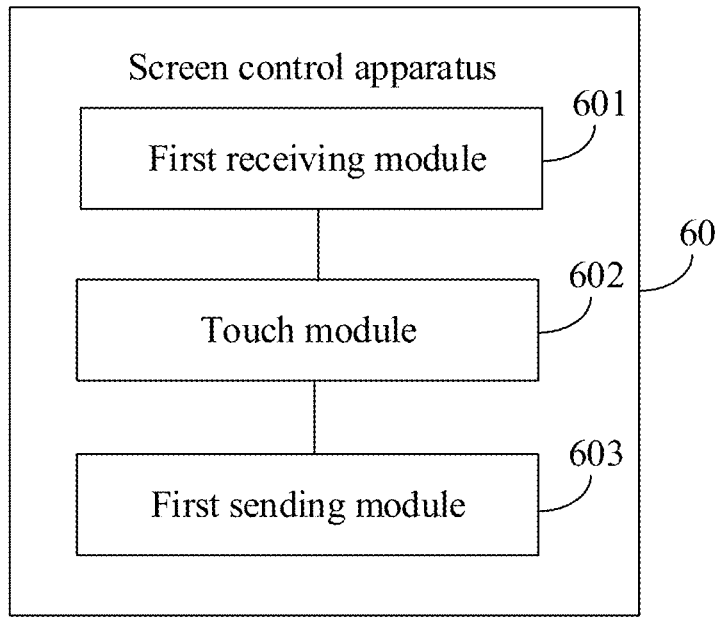
FIG. 15 schematically shows a structure diagram of a screen control apparatus according to some embodiments of the present disclosure.

FIG. 15 schematically shows a structure diagram of a screen control apparatus 60 provided by the present disclosure, applied to a touch terminal with a touch function, and the screen control apparatus 60 includes:

a first receiving module 601 configured to receive an image picture displayed by a non-touch terminal without the touch function, and display the image picture in a touch screen;

a touch module 602 configured to receive touch operation on the image picture; and a first sending module 603 configured to send a control instruction corresponding to the touch operation to the non-touch terminal in response to the touch operation, wherein the control instruction is used for instructing the non-touch terminal to execute control operation on the image picture.

Optionally, the first receiving module 601 is further configured to:

acquire a mapping relationship between a touchable identifier and a picture position carried in the image picture; and add a touchable identifier corresponding to the picture position in a touchable display area corresponding to the picture position in the image picture.

The first sending module 603 is further configured to:

determine a touchable identifier corresponding to a picture position instructed by the touch operation; and send a control instruction carrying the touchable identifier to the non-touch terminal, wherein the control instruction is used for instructing the non-touch terminal to execute control operation corresponding to the touchable identifier on the image picture.

Optionally, the first receiving module 601 is further configured to:

display a non-touch display area which is not added with the touchable identifier and the touchable display area in the image picture differently.

Optionally, the first receiving module 601 is further configured to:

display the non-touch display area in the image picture in a weakened manner and/or displaying the touchable display area in the image picture in a highlighted manner.

Optionally, the first receiving module 601 is further configured to:

display the touchable identifier in a display area outside the image picture in the touch screen.

Optionally, the apparatus further includes:

a communication module configured to:

determine a connectable non-touch terminal in a communication network after accessing the communication network;

send a connection request to the non-touch terminal; and establish communication connection with the non-touch terminal in response to a connection permission notification sent by the non-touch terminal based on the connection request.

Optionally, when the communication network is a local area network, the communication module is further configured to:

receive a connection signal carrying a first network address broadcast by a non-touch terminal in the communication network; and send a connection request carrying a local second network address to the non-touch terminal based on the first network address.

Optionally, when the communication network is a cloud network, the communication module is further configured to:

send an access request carrying local identity information to a cloud server;

receive a connectable non-touch terminal identifier corresponding to the identity information sent by the cloud server; and send a connection request to a target non-touch terminal corresponding to a target non-touch terminal identifier in response to selection operation on the target non-touch terminal identifier.

According to the embodiment of the present disclosure, the non-touch terminal sends the displayed image picture to the touch terminal for the user to perform touch operation, and the touch terminal sends the control instruction to the non-touch terminal according to the touch operation, so that the non-touch terminal controls the displayed image picture according to the control instruction, thereby achieving the touch operation on the image picture in the non-touch terminal.

Figure 16:
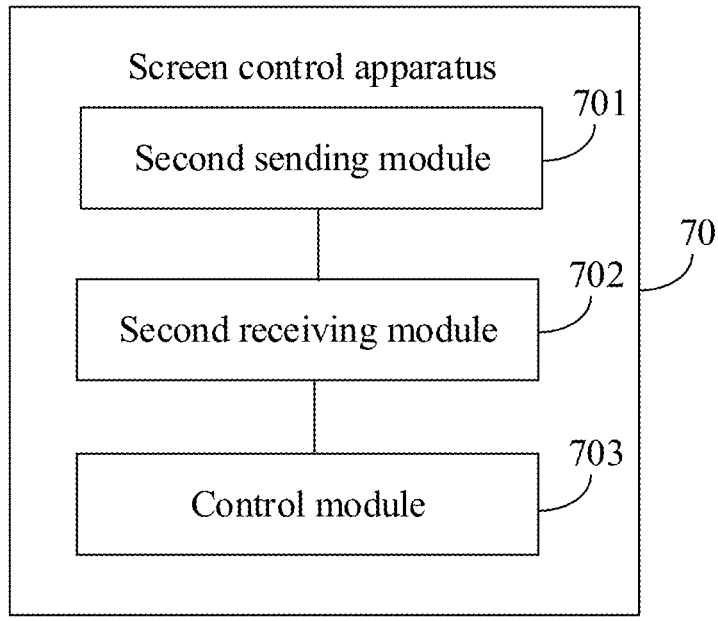
FIG. 16 schematically shows a structure diagram of another screen control apparatus according to some embodiments of the present disclosure.

FIG. 16 schematically shows a structure diagram of another screen control apparatus 70 provided by the present disclosure, applied to a non-touch terminal without a touch function, including:

a second sending module 701 configured to send an image picture to a touch terminal with the touch function when the image picture is displayed by a non-touch screen;

a second receiving module 702 configured to receive a control instruction sent by the touch terminal for the image picture; and a control module 703 configured to execute control operation corresponding to the control instruction on the image picture.

Optionally, the second sending module 701 is further configured to:

perform screen capture on the non-touch screen to obtain an image picture;

establish a mapping relationship between a touchable picture position and a touchable identifier in the image picture; and send the image picture carrying the mapping relationship to the touch terminal.

The control module 703 is further configured to:

acquire a touchable identifier carried in the control instruction;

query a click event corresponding to the touchable identifier; and execute control operation corresponding to the click event on the image picture.

According to the embodiment of the present disclosure, the non-touch terminal sends the displayed image picture to the touch terminal for the user to perform touch operation, and the touch terminal sends the control instruction to the non-touch terminal according to the touch operation, so that the non-touch terminal controls the displayed image picture according to the control instruction, thereby achieving the touch operation on the image picture in the non-touch terminal.

Some examples of the present disclosure provide a display device, including: a screen and a processor, wherein the processor is configured to execute steps of the above screen control method, and the screen is configured to display an image picture.

According to the example of the present disclosure, the non-touch terminal sends the displayed image picture to the touch terminal for the user to perform touch operation, and the touch terminal sends the control instruction to the non-touch terminal according to the touch operation, so that the non-touch terminal controls the displayed image picture according to the control instruction, thereby achieving the touch operation on the image picture in the non-touch terminal.

The device embodiments described above are only schematic, the units illustrated as separated parts may be or may not be separated physically, and the parts shown in unit may be or may not be a physical unit. That is, the parts may be located at one place or distributed in multiple network units. A person skilled in the art may select part or all modules therein to realize the objective of achieving the technical solution of the embodiment.

Each of devices according to the embodiments of the present disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the device according to the embodiments of the disclosure. The disclosure may further be implemented as device program (for example, computer program and computer program product) for executing some or all of the methods as described herein. Such program for implementing the disclosure may be stored in the computer readable medium, or have a form of one or more signals. Such a signal may be downloaded from the internet websites, or be provided in carrier, or be provided in other manners.

Figure 17:
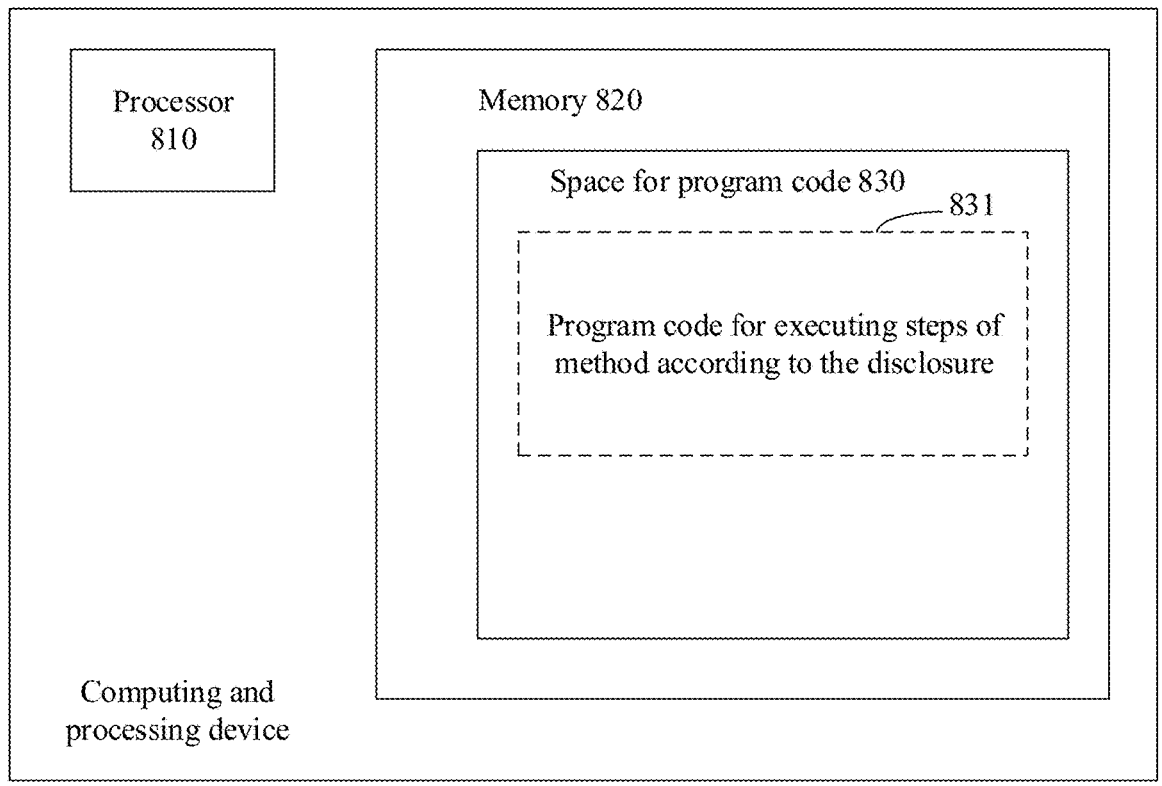
FIG. 17 schematically shows a block diagram of a computing and processing device for executing a method according to some embodiments of the present disclosure.
Figure 18:
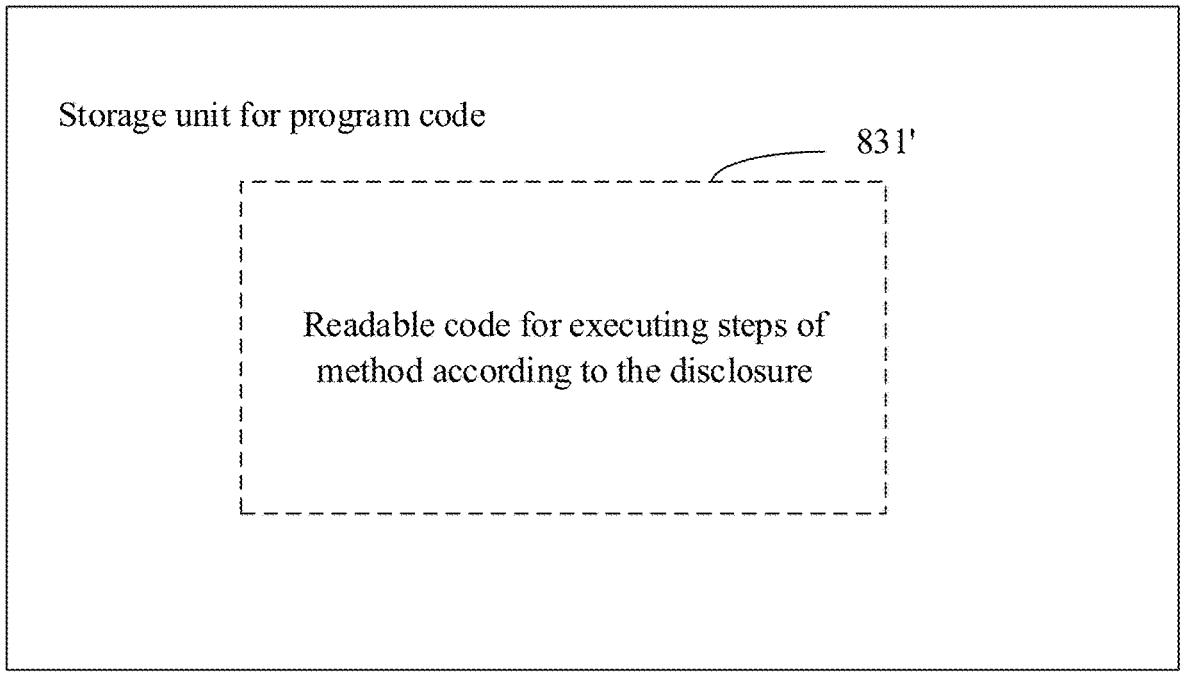
FIG. 18 schematically shows a storage unit for maintaining or carrying a program code for implementing the method according to some embodiments of the present disclosure.

For example, FIG. 17 illustrates a block diagram of an electronic apparatus for executing the method according the disclosure. Traditionally, the electronic apparatus includes a processor 810 and a computer program product or a computer readable medium in form of a memory 820. The memory 820 could be electronic memories such as flash memory, EEPROM (Electrically Erasable Programmable Read-Only Memory), EPROM, hard disk or ROM. The memory 820 has a memory space 830 for executing program codes 831 of any steps in the above methods. For example, the memory space 830 for program codes may include respective program codes 831 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 18. The memory cells may be provided with memory sections, memory spaces, etc., similar to the memory 820 of the server as shown in FIG. 17. The program codes may be compressed for example in an appropriate form. Usually, the memory cell includes computer readable codes 831' which can be read for example by processors 810. When these codes are operated on the server, the server may execute respective steps in the method as described above.

It should be understood that although the various steps in the flow chart in the accompanying drawings are displayed sequentially according to the arrows, these steps are not necessarily executed in the order indicated by the arrows. Unless explicitly stated in this specification, the execution of these steps does not have strict order restrictions and can be carried out in other orders. Moreover, at least a portion of the steps in the flow chart of the accompanying drawings may include multiple sub steps or stages, which may not necessarily be completed at the same time, but may be executed at different times, and their execution order may not necessarily be sequential, but may rotate or alternate with at least a portion of other steps or sub steps or stages.

"An embodiment", "embodiments" or "one or more embodiments" mentioned in the present disclosure means that the specific features, structures or performances described in combination with the embodiments would be included in at least one embodiment of the present disclosure. Moreover, it should be noted that, the wording "in an embodiment" herein may not necessarily refer to the same embodiment.

Many details are discussed in the specification provided herein. However, it should be understood that the embodiments of the present disclosure can be implemented without these specific details. In some examples, the well-known methods, structures and technologies are not shown in detail so as to avoid an unclear understanding of the description.

In the claims, any reference symbol between parentheses should not be constructed as a limitation on the claims. The word "comprising" does not exclude the presence of components or steps not listed in the claims. The word "a/an" or "one" before a component does not exclude the existence of multiple such components. The present disclosure can be achieved through hardware comprising several different components and through appropriately programmed computers. Among the unit claims that list several devices, several of these devices can be specifically embodied through the same hardware item. The use of words such as first, second, and third does not indicate any order. These words can be interpreted as names.

Finally, it should be noted that the above embodiments are only used to illustrate the technical solution disclosed herein, and not to limit it. Although detailed explanations of the present disclosure have been provided with reference to the aforementioned embodiments, persons skilled in the art should understand that they can still modify the technical solutions recorded in the aforementioned embodiments, or equivalently replace some of the technical features therein. And these modifications or replacements do not make the essence of the corresponding technical solutions deviate from the spirit and scope of the technical solutions disclosed in the present disclosure.

The invention claimed is:

1. A screen control method, applied to a touch terminal with a touch function, wherein the method comprises:
receiving an image picture displayed by a non-touch terminal without the touch function, and displaying the image picture in a touch screen;

receiving a touch operation on the image picture; and sending a control instruction corresponding to the touch operation to the non-touch terminal in response to the touch operation, wherein the control instruction is used for instructing the non-touch terminal to execute a control operation on the image picture;

wherein displaying the image picture in a touch screen comprises:

acquiring a mapping relationship between a touchable identifier and a picture position carried in the image picture; and adding a touchable identifier corresponding to the picture position in a touchable display area corresponding to the picture position in the image picture;

wherein sending a control instruction corresponding to the touch operation to the non-touch terminal comprises:

determining a touchable identifier corresponding to a picture position instructed by the touch operation; and sending a control instruction carrying the touchable identifier to the non-touch terminal, wherein the control instruction is used for instructing the non-touch terminal to execute a control operation corresponding to the touchable identifier on the image picture.

2. The method according to claim 1, wherein after adding a touchable identifier corresponding to the picture position, the method further comprises:

displaying a non-touch display area which is not added with the touchable identifier and the touchable display area in the image picture differently.

3. The method according to claim 2, wherein displaying a non-touch display area which is not added with the touchable identifier and the touchable display area in the image picture differently comprises:

displaying the non-touch display area in the image picture in a weakened manner and/or displaying the touchable display area in the image picture in a highlighted manner.

4. The method according to claim 1, wherein after adding a touchable identifier corresponding to the picture position, the method further comprises:

displaying the touchable identifier in a display area outside the image picture in the touch screen.

5. The method according to claim 1, wherein before receiving an image picture displayed by a non-touch terminal without the touch function, and displaying the image picture in a touch screen, the method further comprises:

determining a connectable non-touch terminal in a communication network after accessing the communication network;

sending a connection request to the non-touch terminal; and establishing communication connection with the non-touch terminal in response to a connection permission notification sent by the non-touch terminal based on the connection request.

6. The method according to claim 5, wherein when the communication network is a local area network, determining a connectable non-touch terminal in the communication network comprises:

receiving a connection signal carrying a first network address broadcast by the non-touch terminal in the communication network;

wherein sending a connection request to the non-touch terminal comprises:

sending a connection request carrying a local second network address to the non-touch terminal based on the first network address.

7. The method according to claim 5, wherein when the communication network is a cloud network, determining a connectable non-touch terminal in the communication network comprises:

sending an access request carrying local identity information to a cloud server; and receiving a connectable non-touch terminal identifier corresponding to the local identity information sent by the cloud server;

wherein sending a connection request to the non-touch terminal comprises:

sending the connection request to a target non-touch terminal corresponding to a target non-touch terminal identifier in response to a selection operation on the target non-touch terminal identifier.

8. A screen control method, applied to a non-touch terminal without a touch function, wherein the method comprises:

sending an image picture to a touch terminal with the touch function when the image picture is displayed by a non-touch screen;

receiving a control instruction sent by the touch terminal for the image picture; and executing a control operation corresponding to the control instruction on the image picture;

wherein sending an image picture to a touch terminal with the touch function comprises:

performing screen capture on the non-touch screen to obtain the image picture;

establishing a mapping relationship between a touchable picture position and a touchable identifier in the image picture; and sending the image picture carrying the mapping relationship to the touch terminal;

wherein executing a control operation corresponding to the control instruction on the image picture comprises:

acquiring a touchable identifier carried in the control instruction;

querying a click event corresponding to the touchable identifier; and executing the control operation corresponding to the click event on the image picture.

9. A display device, comprising a screen and a processor, wherein the processor is configured to execute steps of the screen control method according to claim 1, and the screen is configured to display the image picture.

10. A computing and processing device, comprising:

a memory having a computer-readable code stored therein; and one or more processors, wherein when the computer-readable code is executed by the one or more processors, the computing and processing device executes the screen control method according to claim 1.

11. A non-transitory computer-readable medium, having a computer program of the screen control method according to claim 1 stored therein.

12. The display device according to claim 9, wherein after adding a touchable identifier corresponding to the picture position, the processor is configured to execute steps comprising:

displaying a non-touch display area which is not added with the touchable identifier and the touchable display area in the image picture differently.

13. The display device according to claim 12, wherein the step of displaying a non-touch display area which is not added with the touchable identifier and the touchable display area in the image picture differently comprises:

displaying the non-touch display area in the image picture in a weakened manner and/or displaying the touchable display area in the image picture in a highlighted manner.

14. The display device according to claim 9, wherein after adding a touchable identifier corresponding to the picture position, the processor is configured to execute steps comprising:
   displaying the touchable identifier in a display area outside the image picture in the touch screen.

15. The display device according to claim 9, wherein before receiving an image picture displayed by a non-touch terminal without the touch function, and displaying the image picture in a touch screen, the processor is configured to execute steps comprising:
   determining a connectable non-touch terminal in a communication network after accessing the communication network;
   sending a connection request to the non-touch terminal; and
   establishing communication connection with the non-touch terminal in response to a connection permission notification sent by the non-touch terminal based on the connection request.

16. The display device according to claim 15, wherein when the communication network is a local area network, the step of determining a connectable non-touch terminal in the communication network comprises:
   receiving a connection signal carrying a first network address broadcast by the non-touch terminal in the communication network;
   wherein sending a connection request to the non-touch terminal comprises:
   sending a connection request carrying a local second network address to the non-touch terminal based on the first network address.

17. The display device according to claim 15, wherein when the communication network is a cloud network, the step of determining a connectable non-touch terminal in the communication network comprises:
   sending an access request carrying local identity information to a cloud server; and
   receiving a connectable non-touch terminal identifier corresponding to the local identity information sent by the cloud server;
   wherein sending a connection request to the non-touch terminal comprises:
   sending the connection request to a target non-touch terminal corresponding to a target non-touch terminal identifier in response to a selection operation on the target non-touch terminal identifier.

\* \* \* \* \*